US009241337B2

(12) United States Patent
Manssour

(10) Patent No.: US 9,241,337 B2
(45) Date of Patent: Jan. 19, 2016

(54) METHOD AND BASE STATION FOR HANDLING RADIO RESOURCES

(75) Inventor: Jawad Manssour, Seoul (KR)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/397,886

(22) PCT Filed: Apr. 30, 2012

(86) PCT No.: PCT/SE2012/050448
§ 371 (c)(1),
(2), (4) Date: Oct. 30, 2014

(87) PCT Pub. No.: WO2013/165282
PCT Pub. Date: Nov. 7, 2013

(65) Prior Publication Data
US 2015/0156782 A1   Jun. 4, 2015

(51) Int. Cl.
H04W 72/08   (2009.01)
H04W 52/24   (2009.01)
(Continued)

(52) U.S. Cl.
CPC ......... H04W 72/082 (2013.01); H04J 11/0056 (2013.01); H04J 11/0059 (2013.01); H04W 52/243 (2013.01); H04W 52/146 (2013.01);
(Continued)

(58) Field of Classification Search
CPC ... H04L 5/0007; H04L 5/0037; H04L 5/0055; H04W 72/04; H04W 72/1284; H04W 52/243; H04W 72/0413; H04W 28/08; H04W 16/14; H04W 52/146; H04W 52/24; H04W 72/082; H04W 28/0236; H04W 52/244; H04W 84/045; H04B 17/345; H04J 11/00
See application file for complete search history.

(56) References Cited

U.S. PATENT DOCUMENTS

2007/0121547 A1*  5/2007  Huh ..................... H04W 72/10
                                                        370/329
2010/0151876 A1   6/2010  Park et al.
(Continued)

FOREIGN PATENT DOCUMENTS

WO   2011055842 A1   5/2011
WO   2012028180 A1   3/2012

OTHER PUBLICATIONS

Author Unknown, "Analysis of MLB Utlilizing UL TPC Parameters," 3GPP TSG RAN WG1 meeting #65, R1-111238, Barcelona, Spain, May 9-13, 2011, 3 pages.
Author Unknown, "Overload Indicator Handling for LTE," 3GPP TSG RAN WG1 #50bis meeting, R1-074349, Shanghai, China, Oct. 8-12, 2007, 6 pages.
(Continued)

Primary Examiner — Nizar Sivji
(74) Attorney, Agent, or Firm — Withrow & Terranova, PLLC

(57) ABSTRACT

A method and a base station configured to serve a first cell in a cellular network, for supporting radio resource management in the cellular network. When receiving an indication of uplink interference experienced in a neighboring second cell, the base station identifies interfered bandwidth resources on which the interference is experienced, and detects that these resources coincide with resources that have been allocated to User Equipments, UEs, in the first cell. When the interfered bandwidth resources coincide with resources that have been allocated to cell edge UEs in the first cell, the base station allocates bandwidth resources separate from the interfered resources to the cell edge UEs. Further, when the interfered bandwidth resources coincide with resources allocated to cell center UEs in the cell, the base station applies power control for transmissions made by the cell center UEs on the interfered resources.

12 Claims, 3 Drawing Sheets

(51) Int. Cl.
*H04J 11/00* (2006.01)
*H04W 72/04* (2009.01)
*H04W 52/14* (2009.01)
*H04W 52/28* (2009.01)
*H04W 52/34* (2009.01)

(52) U.S. Cl.
CPC .......... *H04W 52/283* (2013.01); *H04W 52/343* (2013.01); *H04W 72/0426* (2013.01)

(56) References Cited

U.S. PATENT DOCUMENTS

| | | | |
|---|---|---|---|
| 2010/0267408 A1 | 10/2010 | Lee et al. | |
| 2011/0211560 A1* | 9/2011 | Yamamoto | H04W 36/20 370/332 |
| 2012/0008569 A1 | 1/2012 | Vrzic et al. | |
| 2013/0260793 A1* | 10/2013 | Lim | G01S 5/10 455/456.1 |

OTHER PUBLICATIONS

Author Unknown, "Way Forward on UL ICIC/Overload Indicator for LTE," 3GPP TSG RAN WG1 #51, R1-075050, Jeju, Korea, Nov. 5-9, 2007, 2 pages.

International Search Report for PCT/SE2012/050448, mailed Apr. 23, 2013, 5 pages.

International Preliminary Report on Patentability for PCT/SE2012/050448, issued Jun. 12, 2014, 7 pages.

Author Unknown, "Technical Specification Group Radio Access Network; Evolved Universal Terrestrial Radio Access Network (E-UTRAN); X2 application protocol (X2AP) (Release 10)," Technical Specification 36.423 (excerpt), Version 10.5.0, Mar. 2012, 3GPP Organizational Partners, pp. 18-19.

Reasons for Refusal for Japanese Patent Application No. 2015-510228, mailed Nov. 6, 2015, 5 pages.

Extended European Search Report for European Patent Application No. 12875885.1, mailed Dec. 12, 2015, 7 pages.

* cited by examiner

METHOD AND BASE STATION FOR HANDLING RADIO RESOURCES

This application is a 35 U.S.C. §371 national phase filing of International Application No. PCT/SE2012/050448, filed Apr. 30, 2012, the disclosure of which is incorporated herein by reference in its entirety.

TECHNICAL FIELD

The present disclosure relates generally to a method and a base station for supporting radio resource management in a cellular network such that interference between cells may be reduced or avoided in a useful manner.

BACKGROUND

In cellular networks for wireless communication, interference often occurs in a cell caused by signals transmitted to or from User Equipments, UEs in nearby located cells, which is a well-known problem. In such a network, the available radio bandwidth is limited and in order to provide capacity for communications in the network having multiple cells, resources pertaining to radio bandwidth must be reused in cells at a sufficient mutual distance so as not to disturb communication for one another. In this context, cells that are located near a serving cell are generally referred to as "neighbouring cells" and this term will be used here in the sense that transmissions in neighbouring cells may potentially disturb transmissions in the serving cell, and vice versa, thus causing interference. It should be noted that a neighbouring cell is not necessarily located right next to the serving cell but may be located one or more cells away, still causing interference.

This disclosure is relevant for cellular networks using any of the following radio access technologies: Orthogonal Frequency Division Multiplexing (OFDM), Single Carrier-Frequency Division Multiple Access (SC-FDMA), Orthogonal Frequency Division Multiple Access (OFDMA), Time Division Multiplex (TDM), and Frequency Division Multiplex (FDM). Further, resources pertaining to radio bandwidth will be referred to as "bandwidth resources" for short. Typically, bandwidth resources can be defined by any combination of frequencies and time intervals. In systems of Long Term Evolution, LTE, the bandwidth resources are known as Physical Resource Blocks, PRBs, defined by frequency and time interval, and in the following text bandwidth resources can be understood as PRBs in an LTE context.

A general problem in cellular networks is that the performance in communications may be degraded and the network capacity may also be reduced, due to interference when the same bandwidth resources are reused in multiple nearby cells. This problem is common for so-called "cell edge UEs" located near the cell border but relatively far from the serving base station when the latter is situated at the cell centre, thus requiring relatively high transmit power and also being close to neighbouring cells in the vicinity, as opposed to so-called "cell centre UEs" located closer to the serving base station which therefore need less transmit power for proper communication.

A serving base station may also be located at one end or corner of the cell, e.g. when forming a sector cell or the like. In that case, a cell-edge UE located near the opposite end or corner of the cell will be "far" from the base station but "close" to an adjacent neighbouring cell, relatively speaking. On the other hand, a cell-edge UE might still be physically close to the base station but in the intersection between two cells. The terms "cell edge UEs" and "cell centre UEs" will be used here in a relative sense and without limitation to any particular distance to the serving base station and cell border, respectively, wherein cell edge UEs are more inclined to cause inter-cell interference than cell centre UEs.

FIG. 1 illustrates an example with two neighbouring cells A and B having radio coverage provided by a first base station 100A and a second base station 100B, respectively, both being situated at respective cell centres in this case. In cell A, a cell centre UE 102 and a cell edge UE 104 transmit uplink data signals x and y, respectively, where signal y is stronger than signal x in this case mainly due to the difference in distance to their serving base station 100A. UE 104 is also located close to cell B. The figure also illustrates that another UE 106 in cell B transmits an uplink data signal z using bandwidth resources that coincide with at least those used by the UE 104, and signal z may therefore be interfered by the uplink transmission of signal y from UE 104 when received by the second base station 100B, indicated by an interfering signal y'. Signal x will likely not cause any interference in cell B in this case since it is transmitted with substantially less power, and also because UE 102 is located farther away from base station 100B than UE 104.

In order to address such interference related problems, several Radio Resource Management, RRM, mechanisms have been devised. Among others, so-called "Inter-Cell Interference Coordination, ICIC" can be employed where neighbouring base stations exchange information, e.g. over an X2 interface defined in LTE, e.g. in order to coordinate their use of bandwidth recourses. Another RRM mechanism is using power control such that the power used for signal transmissions, either uplink or downlink, is controlled to be no higher than needed for proper signal detection, thus not causing interference to no avail. Basically, ICIC refers to coordinated schemes dependent of information exchange between base stations, while power control can be used more autonomously. Some examples of ICIC schemes are briefly outlined below with reference to FIG. 2 illustrating exchange of information between the base stations 100A and 100B of FIG. 1.

A so-called "High Interference Indicator, HII", referring to uplink resource allocations for UEs in a serving cell, may be sent to the base stations of one or more neighbouring cells. The HII parameter indicates that a certain set of uplink bandwidth resources, e.g. PRBs, will be allocated to UEs in the first cell which potentially cause high inter-cell interference, such as cell edge UEs requiring high transmission power. A neighbouring base station receiving the HII is thus able to avoid using the same bandwidth resources in its own cell, if possible. In FIG. 2, base station 100A sends the HII to base station 100B in an action 2:1a, indicating that transmissions on a particular resource, such as signal y, are likely to cause interference in neighbouring cells. Another action 2:1b indicates with dashed arrows that base station 100A sends this HII to other neighbouring base stations as well, not shown.

A so-called "Interference Overload Indicator, IOI", referring to uplink interference experienced in a cell, may further be sent from a base station of that cell to the base stations of one or more neighbouring cells. The IOI parameter basically indicates that a certain level of interference is currently experienced on a set of bandwidth resources in the cell. It is common to indicate this level as high, medium or low. In response thereto, a base station receiving the IOI can thus reduce the inter-cell interference by allocating a different set of resources to its own UEs. In FIG. 2, base station 100B sends the IOI to base station 100A, in an action 2:2a, indicating that a certain level of interference is experienced in the cell of base station 100B on certain bandwidth resources. This interference may be caused by signal y' and/or by other signals in other cells as well, and base station 100B does not really know which cell(s) the interfering signals come from. Another action 2:2b indicates with dashed arrows that base station 100B sends this IOI to other neighbouring base stations as well, not shown. The HII can be seen as a proactive RRM mechanism while the IOI is a reactive one.

The above RRM mechanisms entail various restrictions in the usage of radio resources to limit the effects of interference between cells, also resulting in reduced capacity in the cells involved. It is a problem that the above RRM mechanisms and others are sometimes employed without much effect on the interference between cells, while still significantly reducing capacity in the cells.

As mentioned above, it is possible for base stations to avoid using bandwidth resources being subject to interference, e.g. as indicated by the above HII or IOI, and therefore often re-allocate any UEs using interfered resources. This behaviour may be helpful but sometimes results in frequent re-allocation of resources back and forth, more or less in a "ping-pong" manner, without really solving the interference problem, instead causing instability, deterioration in service quality, and excessive signalling and processing.

SUMMARY

It is an object to address at least some of the problems and issues outlined above, particularly to avoid inefficient re-allocation of bandwidth resources, e.g. back and forth, with little or no effect on interference. It is possible to achieve these objects and others by using a method and a base station as defined in the attached independent claims.

According to one aspect, a method is provided in a base station serving a first cell in a cellular network, for supporting radio resource management in the cellular network. In this method, when receiving an indication of uplink interference experienced in a neighbouring second cell, the base station identifies interfered bandwidth resources on which the uplink interference is experienced in the neighbouring second cell based on the received indication of uplink interference. The base station also detects that the interfered bandwidth resources coincide with bandwidth resources that have been allocated to User Equipments, UEs, in the first cell. When the interfered bandwidth resources coincide with bandwidth resources that have been allocated to cell edge UEs in the first cell, the base station allocates bandwidth resources separate from the interfered bandwidth resources to the cell edge UEs. Further, when the interfered bandwidth resources coincide with bandwidth resources that have been allocated to cell centre UEs in the first cell, the base station applies power control for uplink transmissions made by the cell centre UEs on the interfered bandwidth resources.

According to another aspect, a base station is provided that is configured to serve a first cell in a cellular network and to support radio resource management in the cellular network. The base station comprises a receiving unit adapted to receive an indication of uplink interference experienced in a neighbouring second cell, and a logic unit adapted to identify interfered bandwidth resources on which the uplink interference is experienced in the neighbouring second cell based on the received indication of uplink interference. The logic unit is further adapted to detect that the interfered bandwidth resources coincide with bandwidth resources that have been allocated to User Equipments, UEs, in the first cell.

The base station also comprises an allocation unit adapted to allocate bandwidth resources separate from the interfered bandwidth resources, to cell edge UEs in the first cell when the logic unit detects that the interfered bandwidth resources coincide with bandwidth resources that have been allocated to the cell edge UEs. The base station also comprises a power control unit adapted to apply power control for uplink transmissions made by cell centre UEs in the first cell on the interfered bandwidth resources when the logic unit detects that the interfered bandwidth resources coincide with bandwidth resources that have been allocated to the cell centre UEs.

In the above method and base station, the bandwidth resources may comprise Physical Resource Blocks, PRBs, defined by frequency and time interval. The above method and base station may be configured and implemented according to different optional embodiments. In one possible embodiment, the power control may include reducing uplink transmit power on the interfered bandwidth resources for a cell centre UE as long as a certain Signal-to-Noise Ratio, SNR, target is fulfilled by the cell centre UE.

The indication of uplink interference may be an Interference Overload Indicator, IOI, received from a base station serving the second cell, or from a network node representing that base station such as a Radio Network Controller, RNC or similar. The IOI thus indicates interference level experienced in the second cell on specific bandwidth resources. Further, a number of neighbouring cells may be selected for coordination of bandwidth resource allocation such that this number does not exceed a certain limit.

In further possible embodiments, a neighbouring cell may be selected for coordination of bandwidth resource allocation based on at least one of: the number of identified interfered bandwidth resources, the number of cell edge UEs in the first cell using the interfered bandwidth resources, the amount of interference in the second cell caused by the cell edge UEs in the first cell, and the identity of the neighbouring second cell. Further, the above allocating of bandwidth resources separate from the interfered bandwidth resources to the cell edge UEs may be performed only if bandwidth resources have not been re-allocated previously for the cell edge UEs within a certain preceding time period.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which can be used in a base station serving a first cell in a cellular network to support radio resource management in the cellular network, particularly to counteract inter-cell interference on the uplink in a more efficient manner. In this solution, it is possible to avoid the above-described inefficient re-allocation of bandwidth resources to UEs in the cell, particularly back and forth in a "ping-pong" manner, when having little or no effect on inter-cell interference.

When an indication of interference experienced in a neighbouring cell is received, such as the above-described IOI, and when the base station of the first cell detects that the bandwidth resources affected by the interference coincide with resources allocated to UEs in first cell, the base station will apply resource re-allocation for the UEs if they are cell edge UEs. On the other hand, if the UEs are cell center UEs, the base station will apply power control for the UEs. Thus assuming that resource re-allocation for cell edge UEs is more likely to succeed for counteracting the interference experienced in the neighbouring cell, while resource re-allocation for cell centre UEs is likely less effective which therefore can keep their bandwidth resources and reduce their transmission power instead if possible.

Figure 1:
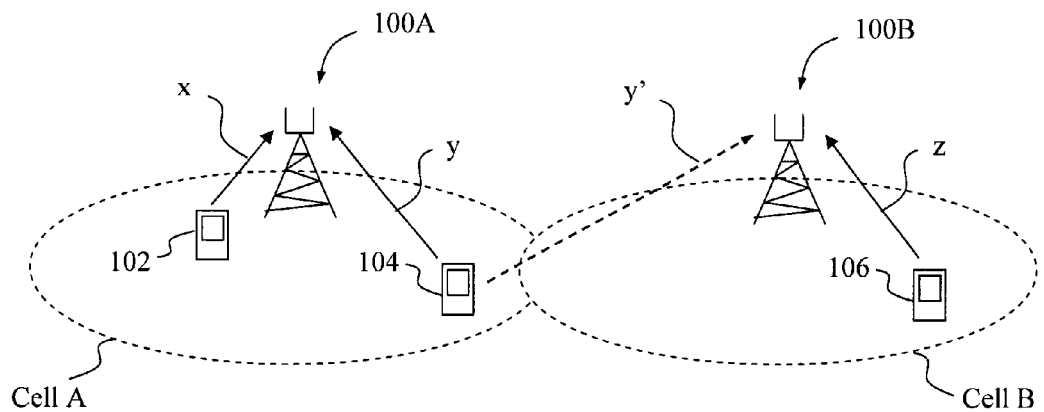
FIG. 1 is a communication scenario illustrating generally how interference can occur between UE transmissions in adjacent cells, according to the prior art.
Figure 2:
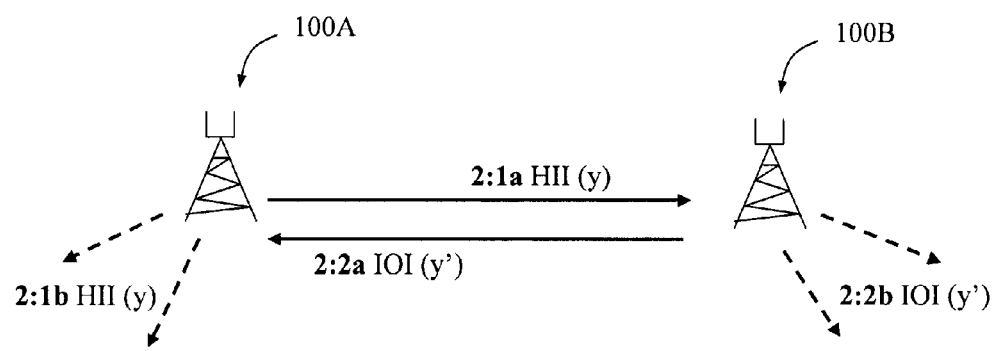
FIG. 2 illustrates how the base stations in FIG. 1 can exchange information for interference coordination, according to the prior art.
Figure 3:
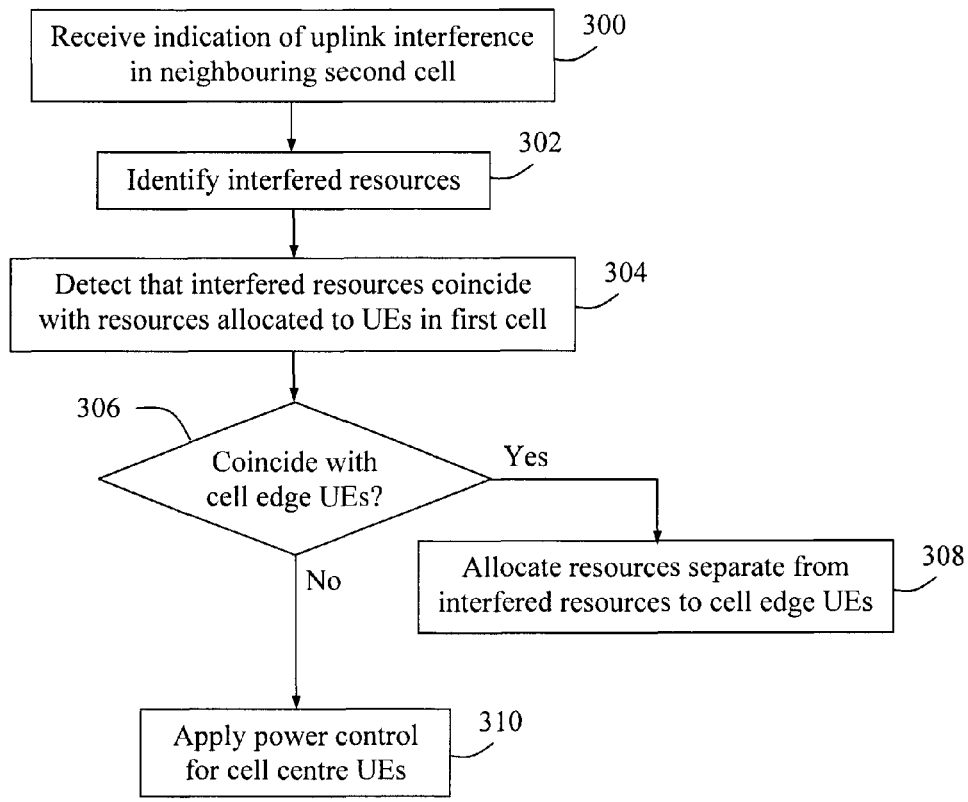
FIG. 3 is a flow chart illustrating a procedure in a base station, according to some possible embodiments.

An example of using this solution will now be described in more detail in terms of a procedure in a base station for supporting radio resource management in a cellular network, and with reference to the flow chart in FIG. 3. It is assumed that the base station serves a "first" cell in the cellular network, i.e. by providing connectivity for any UEs in the first cell, and that there are at least one neighbouring cell, referred to as a "second" cell, located in the vicinity, e.g. next to the first cell. Analogous with the above description of FIG. 1, the UEs in the first cell can be either regarded as cell edge UEs or cell centre UEs depending on their current position in the cell. It is further assumed that the base station is able to distinguish between cell edge UEs and cell centre UEs in a suitable manner, e.g. based on signal strength measurements, which as such is however somewhat outside the scope of this solution.

A first action 300 illustrates that the base station of the first cell receives an indication of uplink interference in the neighbouring second cell, which could be the above-described IOI indicating interference level experienced in the second cell on specific bandwidth resources, although the solution is not limited to any particular indication or message. The indication of uplink interference may be received directly from a base station serving the neighbouring second cell, or from another network node such as a Radio Network Controller, Base Station Controller, or the like, in this context acting on behalf of the base station of the second cell.

In a next action 302, the base station of the first cell identifies which bandwidth resources are interfered according to the indication of uplink interference, which information may be explicitly or implicitly provided in the received indication. As further mentioned above, the IOI parameter basically indicates that a certain level of interference is currently experienced on certain bandwidth resources, commonly indicated as high, medium or low, or similar. For example, the base station of the first cell may identify bandwidth resources marked with high in the received indication as the interfered resources in this action.

The base station of the first cell then detects that the identified interfered bandwidth resources coincide with resources currently allocated to UEs in the first cell, in a further action 304, which may be done by checking which bandwidth resources are used at the moment for uplink transmissions in the cell. In this respect, all or just some of the interfered bandwidth resources may coincide with the allocated resources, i.e. by wholly or partly overlapping one another. It is then determined whether the interfered bandwidth resources coincide, at least partly, with bandwidth resources allocated to any cell edge UEs in the first cell, in a further action 306.

When it is found that the interfered bandwidth resources coincide with bandwidth resources that have been allocated to cell edge UEs in the first cell, that is "yes" in action 306, the base station of the first cell decides to apply re-allocation for those UEs by allocating new bandwidth resources to the cell edge UEs which are separate from the interfered bandwidth resources, as shown in an action 308. Otherwise, when it is found that the interfered bandwidth resources do not coincide with bandwidth resources that have been allocated to cell edge UEs in the first cell, that is "no" in action 306, it can be deduced that they coincide instead with bandwidth resources that have been allocated to cell centre UEs. The latter conclusion can easily be made since it was detected in action 304 that the interfered bandwidth resources coincide with resources allocated to some UEs in the first cell.

Thus, when the interfered bandwidth resources coincide with bandwidth resources that have been allocated to cell centre UEs in the first cell, the base station of the first cell decides to apply power control for uplink transmissions made by the cell centre UEs on the interfered bandwidth resources, as shown in an action 310. In this case, power control is assumed to be more efficient for cell centre UEs than re-allocation of resources, even though the base station is not able to know how much of the interference experienced in the second cell is caused by uplink transmissions from the cell centre UEs in the first cell. This interference could alternatively or additionally be caused by uplink transmissions from UEs in other cells as well.

Although UEs are referred to in the plural form above, it should be noted that the described procedure can be employed for any number of UEs currently connected to the base station, including just one UE in the cell. Further, the bandwidth resources discussed above may comprise Physical Resource Blocks, PRBs, defined by frequency and time interval, e.g. as in LTE, although the solution is not limited to any particular format or standard for defining bandwidth resources.

In this way, re-allocation is only applied for cell edge UEs while power control is applied for cell centre UEs, assuming that re-allocation of bandwidth resources would likely not be efficient for cell centre UEs and might result in continued interference causing further re-allocation of resources, e.g. back and forth in a ping-pong manner. By using this solution however, e.g. according to the above described procedure, it is possible to avoid this negative situation in an efficient manner. Further, when the interfered resources coincide partly with those allocated to cell edge UEs and partly with those allocated to cell centre UEs in the first cell, re-allocation may be applied for the cell edge UEs and power control may be applied for the cell centre UEs, such that both actions 308 and 310 will be essentially executed although for different UEs.

A mechanism may further be used to prevent re-allocation of resources to cell-edge UEs if such a re-allocation has already been made very recently. Thus in this embodiment, the allocating of bandwidth resources separate from the interfered bandwidth resources to the cell edge UEs is performed only if bandwidth resources have not been re-allocated previously for the cell edge UEs within a certain preceding time period. If they have, the base station may refrain from executing the re-allocation, for the time being, and wait until another indication of uplink interference is received as of action 300. This mechanism may be used to avoid resource re-allocation too soon, e.g. caused by swiftly fluctuating interference conditions. The preceding time period may be set to a suitable value which allows for efficient usage of this solution.

In the above example, just one neighbouring cell was considered, i.e. the second cell, for simplicity. However, in this solution a number of neighbouring cells may be selected for coordination of bandwidth resource allocation, e.g. such that the number of neighbouring cells does not exceed a certain limit. It may be practical to select just one or two neighbouring cells at a time for this coordination, although the solution is not limited in this respect.

Selecting a neighbouring cell for the above-described coordination may be done in different ways, provided that an indication of uplink interference experienced in the neighbouring cell has been received for that cell, e.g. from its base station. To mention a few possible practical examples, a neighbouring cell may be selected for coordination of bandwidth resource allocation based on at least one of the following criteria:

1) The number of identified interfered bandwidth resources mentioned in the received indication of uplink interference. For example, a neighbouring cell may be selected for coordination if the number of such interfered bandwidth resources exceeds a certain limit.
2) The number of cell edge UEs in the first cell using the interfered bandwidth resources. For example, a neighbouring cell may be selected for coordination if the number of such cell edge UEs exceeds a certain limit.
3) The amount of interference in the second cell caused by the cell edge UEs in the first cell. For example, a neighbouring cell may be selected for coordination if this amount or level of interference exceeds a certain limit.
4) The identity of the neighbouring second cell. For example, a neighbouring cell may be selected for coordination if its cell identity is a number closest to the cell identity of the first cell out of those for which an indication of uplink interference, e.g. IOI has been received.

It should be noted that any number of the above criteria may be used in this solution in any combination, or just one of them.

If more than one neighbouring cell are selected for coordination of bandwidth resource allocation, e.g. as a result of evaluating any of the above criteria, this coordination may be done in different ways. For example, if it is decided to coordinate with two neighbour cells at some point, the following optional coordination schemes are possible to employ. It is assumed that "cell 1" is the first cell in this context and "cell 2" and "cell 3" are neighbor cells that have sent an IOI that was received by cell 1.

Option 1: If both cell 2 and cell 3 have allocated the same bandwidth resources to cell edge users as cell 1, then cell 1 simply changes its allocation of bandwidth resources to cell edge users to be separate from those used in cells 2 and 3.

Option 2: If both cell 2 and cell 3 have allocated the same bandwidth resources to cell edge users but different than cell 1, then cell 1 may decide to use power control. The power control may be done to satisfy one or both of cell 2 and cell 3.

Option 3: If cell 2 has allocated the same bandwidth resources to cell edge users as cell 1, but cell 3 has a different allocation to cell edge users than cell 1, cell 1 may decide to keep the same allocation to cell edge users as cell 2 and apply power control to satisfy cell 3. Alternatively, cell 1 may decide to change its allocation to cell edge users and apply power control to satisfy cell 2. The decision may be based on the same criteria as discussed above.

Applying power control for cell centre UEs, as of action 310 above, may include ordering a cell centre UE to reduce its uplink transmit power on the interfered bandwidth resources in an attempt to reduce this interference, as long as a certain Signal-to-Noise Ratio, SNR, target is at least fulfilled by the cell centre UE. For example, the SNR may be determined by path loss calculations in a manner that is well-known as such and not necessary to describe here in detail. In order to maintain satisfactory communication for the UE, the actual SNR for the UE in question should not go below the SNR target since it will be difficult, if not impossible, for the base station to properly receive and decode signals transmitted from the UE if the received signals are too weak in relation to noise, i.e. too low SNR.

SNR targets are commonly used for power control in general, although the SNR target used for this solution may be different than those used otherwise in other contexts. The SNR target to use for this solution may be set high enough so as to ensure that the communication and quality thereof will not suffer from this power control at least. As said above, it is not known to which extent this particular UE actually contributes to the experienced interference and the reduction of its transmit power may in this respect be effective or not.

Figure 4:
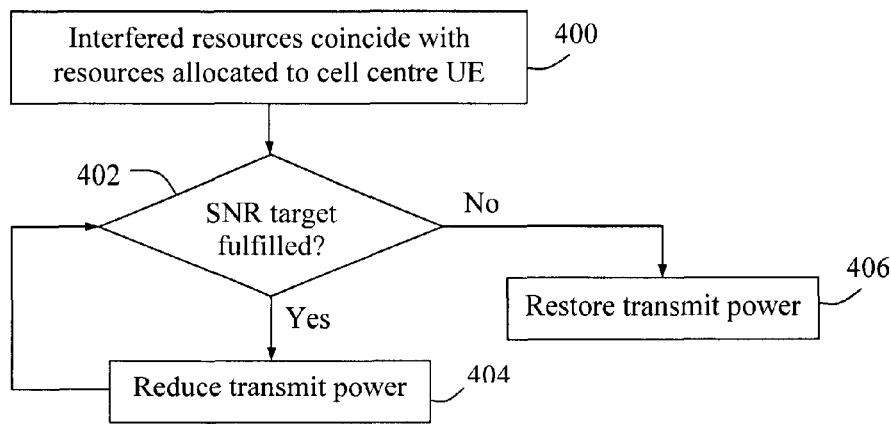
FIG. 4 is a flow chart illustrating a continued procedure in a base station when power control is employed, according to further possible embodiments.

The flow chart in FIG. 4 illustrates a practical example of a useful procedure for applying power control for a cell centre UE in this context, i.e. after deciding that power control should be applied for a cell centre UE as of action 310, in an attempt to reduce the experienced inter-cell interference. A first shown action 400 illustrates that the base station of the first cell has determined that the interfered bandwidth resources, as experienced in the neighbouring second cell, more or less coincide with resources that have been allocated to the cell centre UE and that power control shall be applied, i.e. basically the outcome of actions 306 and 310 in FIG. 3.

In a following action 402, the base station checks if the transmit power currently used by the cell centre UE provides a signal strength received in the base station that fulfils the SNR target or not. If so, "yes" in action 402, it is assumed that the used transmit power might be unnecessarily high and that it could be possible to reduce it further. The base station of the first cell accordingly orders the UE to reduce its transmit power in a further action 404, e.g. by a certain prescribed amount, and then evaluates the SNR target in view of the resulting signal strength once again by returning to action 402. Actions 402 and 404 may be repeated in this way a number of times by reducing the power gradually each time, i.e. step by step, until the SNR target is no longer fulfilled.

Thus, if it is eventually found in action 402 that the transmit power used by the cell centre UE has been reduced so much that the SNR target is not fulfilled by the received signal strength, "no" in action 402, the base station of the first cell orders the UE to restore its transmit power to a level that fulfils the SNR target, e.g. the previously used transmit power, in a final shown action 406. In this way, the cell centre UE will use a transmit power that is as low as possible without compromising the communication quality or the ability of receiving and properly decoding signals when transmitted from the UE using the controlled transmit power. The cell centre UE will thus not cause inter-cell interference in the second cell more than justified.

Figure 5:
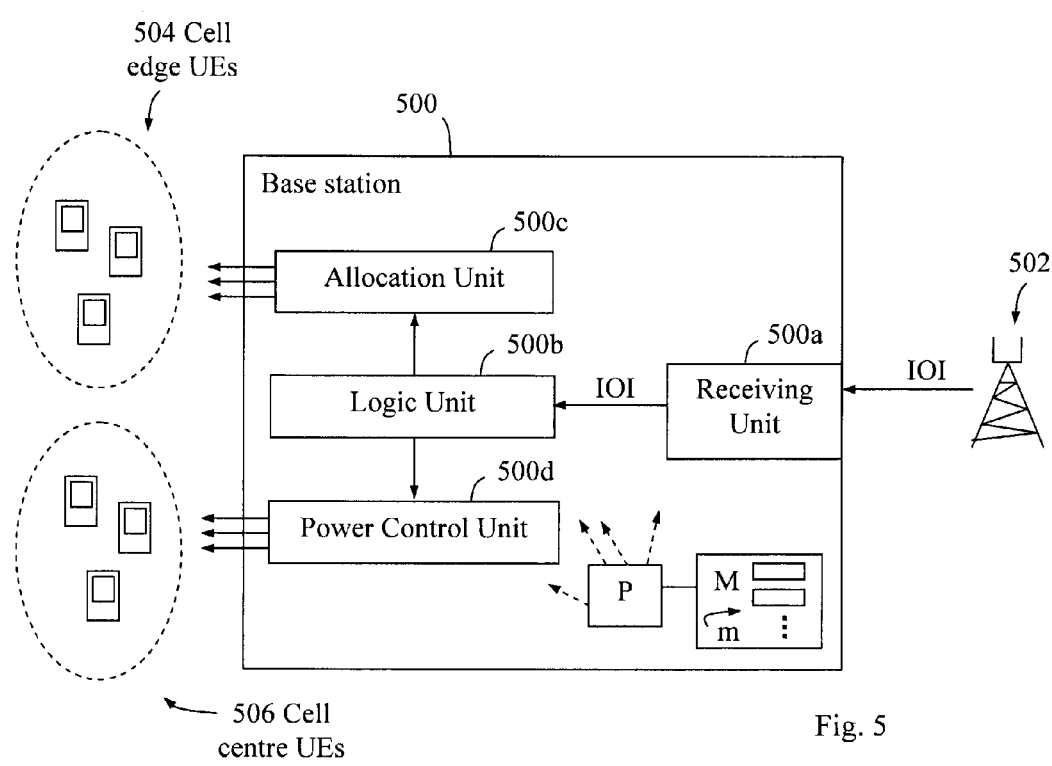
FIG. 5 is a block diagram illustrating a base station with functional units in more detail, according to further possible embodiments.

A detailed but non-limiting example of how a base station can be configured to accomplish the above-described solution, is illustrated by the block diagram in FIG. 5. The base station 500 is serving a first cell in a cellular network and is configured to support radio resource management in the cellular network, e.g. according to the procedures described above for any of FIGS. 3 and 4, respectively. The base station 500 will now be described in terms of a possible example of employing the solution.

The base station 500 comprises a receiving unit 500a adapted to receive an indication of uplink interference experienced in a neighbouring second cell. In this example, the receiving unit 500a is shown to receive an IOI as this indication directly from a base station 502 serving the neighbouring second cell. The base station 500 further comprises a logic unit 500b adapted to identify interfered bandwidth resources on which the uplink interference is experienced in the neighbouring second cell based on the received indication of uplink interference. The logic unit 500b is further adapted to detect that the interfered bandwidth resources coincide with bandwidth resources that have been allocated to UEs in the first cell.

The base station 500 also comprises an allocation unit 500c adapted to allocate bandwidth resources separate from the interfered bandwidth resources, to cell edge UEs 504 in the first cell when the logic unit 500b detects that the interfered bandwidth resources coincide with bandwidth resources that have been allocated to the cell edge UEs. The base station 500 also comprises a power control unit 500d adapted to apply power control for uplink transmissions made by cell centre UEs 506 in the first cell on the interfered bandwidth resources when the logic unit 500b detects that the interfered bandwidth resources coincide with bandwidth resources that have been allocated to the cell centre UEs. As in the previous examples, it may be detected whether the interfered bandwidth resources coincide with those that have been allocated to cell edge UEs and/or to cell centre UEs by checking which bandwidth resources are used at the moment for uplink transmissions in the cell and by which category of UEs, i.e. cell edge or cell centre UEs.

The above base station 500 and its functional units 500a-d may be configured or adapted to operate according to various optional embodiments. In a possible embodiment, the power control unit 500d may be adapted to apply the power control by reducing uplink transmit power on the interfered bandwidth resources for a cell centre UE as long as a certain Signal-to-Noise Ratio, SNR, target is fulfilled by the cell centre UE. This embodiment may be used to avoid too low transmit power that could impair the quality and/or efficiency. In another possible embodiment, the indication of uplink interference can be an IOI, and the receiving unit 500a may in that case be adapted to receive the IOI from the base station 502 serving the second cell, the IOI indicating interference level experienced in the second cell on specific bandwidth resources.

The logic unit 500b may be further adapted to select a number of neighbouring cells for coordination of bandwidth resource allocation such that this number does not exceed a certain limit. This embodiment may be used to avoid too much signalling and/or processing and to improve the efficiency of this solution. The logic unit 500b may be further adapted to select a neighbouring cell for coordination of bandwidth resource allocation based on at least one of: the number of identified interfered bandwidth resources, the number of cell edge UEs in the first cell using the interfered bandwidth resources, the amount of interference in the second cell caused by the cell edge UEs in the first cell, and the identity of the neighbouring second cell. These embodiments may be used to improve the efficiency of this solution.

The allocation unit 500c may be further adapted to allocate bandwidth resources separate from the interfered bandwidth resources, to the cell edge UEs (504) in the first cell only if bandwidth resources have not been re-allocated previously for the cell edge UEs within a certain preceding time period. This embodiment may be used to avoid too frequent re-allocation of the resources and the processing and signalling associated therewith.

It should be noted that FIG. 5 illustrates various functional units in the base station 500 and the skilled person is able to implement these functional units in practice using suitable software and hardware. Thus, the solution is generally not limited to the shown structures of the base station 500, and the functional units 500a-d may be configured to operate according to any of the features described in this disclosure, where appropriate.

The functional units 500a-d described above can be implemented in the base station 500 by means of program modules of a respective computer program comprising code means which, when run by a processor "P" causes the base station 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the base station 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the base station 500.

While the solution has been described with reference to specific exemplary embodiments, the description is generally only intended to illustrate examples of useful features and should not be taken as limiting the scope of the solution. For example, the terms "base station", "neighbouring cell", "indication of uplink interference", "bandwidth resources", "power control", "cell edge UEs" and "cell centre UEs" have been used throughout this description, although any other corresponding nodes, functions, and/or parameters could also be used having the features and characteristics described here. The solution is defined by the appended claims.

The invention claimed is:

1. A method in a base station serving a first cell in a cellular network, for supporting radio resource management in the cellular network, the method comprising:
receiving an indication of uplink interference experienced in a neighbouring second cell,
identifying interfered bandwidth resources on which said uplink interference is experienced in the neighbouring second cell based on the received indication of uplink interference,
detecting that the interfered bandwidth resources coincide with bandwidth resources that have been allocated to User Equipments (UEs) in the first cell,
when the interfered bandwidth resources coincide with bandwidth resources that have been allocated to cell edge UEs in the first cell, allocating bandwidth resources separate from the interfered bandwidth resources to the cell edge UEs, and
when the interfered bandwidth resources coincide with bandwidth resources that have been allocated to cell centre UEs in the first cell, applying power control for uplink transmissions made by the cell centre UEs on the interfered bandwidth resources;

wherein the bandwidth resources comprise Physical Resource Blocks (PRBs) defined by frequency and time interval.

2. A method according to claim 1, wherein said power control includes reducing uplink transmit power on the interfered bandwidth resources for a cell centre UE as long as a certain Signal-to-Noise Ratio (SNR) target is fulfilled by the cell centre UE.

3. A method according to claim 1, wherein the indication of uplink interference is an Interference Overload Indicator (IOI) received from a base station serving the second cell, the IOI indicating interference level experienced in the second cell on specific bandwidth resources.

4. A method according to claim 1, wherein a number of neighbouring cells are selected for coordination of bandwidth resource allocation such that said number does not exceed a certain limit.

5. A method according to claim 1, wherein a neighbouring cell is selected for coordination of bandwidth resource allocation based on at least one of: the number of identified interfered bandwidth resources, the number of cell edge UEs in the first cell using the interfered bandwidth resources, the amount of interference in the second cell caused by said cell edge UEs in the first cell, and the identity of the neighbouring second cell.

6. A method according to claim 1, wherein said allocating of bandwidth resources separate from the interfered bandwidth resources to the cell edge UEs is performed only if bandwidth resources have not been re-allocated previously for said cell edge UEs within a certain preceding time period.

7. A base station configured to serve a first cell in a cellular network and to support radio resource management in the cellular network, the base station comprising:
at least one processor; and
memory containing software executable by the at least one processor whereby the base station is adapted to:
receive an indication of uplink interference experienced in a neighbouring second cell,
identify interfered bandwidth resources on which said uplink interference is experienced in the neighbouring second cell based on the received indication of uplink interference, and detect that the interfered bandwidth resources coincide with bandwidth resources that have been allocated to User Equipments (UEs) in the first cell,
allocate bandwidth resources separate from the interfered bandwidth resources, to cell edge UEs in the first cell when the base station detects that the interfered bandwidth resources coincide with bandwidth resources that have been allocated to said cell edge UEs, and
apply power control for uplink transmissions made by cell centre UEs in the first cell on the interfered bandwidth resources when the base station detects that the interfered bandwidth resources coincide with bandwidth resources that have been allocated to said cell centre UEs;
wherein the bandwidth resources comprise Physical Resource Blocks (PRBs) defined by frequency and time interval.

8. A base station according to claim 7, wherein the base station is adapted to apply said power control by reducing uplink transmit power on the interfered bandwidth resources for a cell centre UE as long as a certain Signal-to-Noise Ratio (SNR) target is fulfilled by the cell centre UE.

9. A base station according to claim 7, wherein the indication of uplink interference is an Interference Overload Indicator (IOI) and the base station is adapted to receive the IOI from a base station serving the second cell, the IOI indicating interference level experienced in the second cell on specific bandwidth resources.

10. A base station according to claim 7, wherein the base station is further adapted to select a number of neighbouring cells for coordination of bandwidth resource allocation such that said number does not exceed a certain limit.

11. A base station according to claim 7, wherein the base station is further adapted to select a neighbouring cell for coordination of bandwidth resource allocation based on at least one of: the number of identified interfered bandwidth resources, the number of cell edge UEs in the first cell using the interfered bandwidth resources, the amount of interference in the second cell caused by said cell edge UEs in the first cell, and the identity of the neighbouring second cell.

12. A base station according to claim 7, wherein the base station is further adapted to allocate bandwidth resources separate from the interfered bandwidth resources, to said cell edge UEs in the first cell only if bandwidth resources have not been re-allocated previously for said cell edge UEs within a certain preceding time period.

* * * * *